Patented Sept. 29, 1925.

1,555,016

UNITED STATES PATENT OFFICE.

LEON LILIENFELD, OF VIENNA, AUSTRIA.

REMEDY AND PROCESS OF MAKING THE SAME.

No Drawing. Application filed December 6, 1921. Serial No. 520,390.

*To all whom it may concern:*

Be it known that I, LEON LILIENFELD, of Podhajce, Poland, a citizen of the Republic of Poland, residing at Vienna, Austria, have invented certain new and useful Improvements in Remedies and Processes of Making the Same, of which the following is a specification.

The application of selenium and selenium compounds (not containing metals) on the one hand, and of metals and metal compounds (not containing selenium or tellurium) on the other, as remedies for malignant tumors, has been frequently tried. The aforesaid bodies have not generally proven successful, due to the fact that either their curative power has been too slight, or their toxicity too great.

Selenium (atomic weight 79.2) and tellurium (atomic weight 127.6) may be embraced in the term a metalloid of the sixth group of the periodic system, having an atomic between 79.2 and 127.6.

I have made the surprising discovery that selenides or tellurides of metals produce a curative effect without causing troublesome toxic symptoms.

The present invention relates to such remedies and to a process of manufacturing them, which process consists in producing selenides of metals or tellurides of metals in a colloidal state or in a colloid solution.

The process may be carried out for instance by allowing selenium compounds or tellurium compounds, which react with metals with the formation of selenides or tellurides to act upon metals or metal compounds in the presence or absence of protective colloids (such as gelatine, proteids, casein, protalbinic acid or lysalbinic acid, or their salts, gum arabic, tragacanth, starch, dextrine, soaps and the like).

Also those alkyl derivatives of the polysaccharides which are soluble in cold water are protective colloids answering in the highest degree the present purpose. These bodies are distinguished by their property of precipitating or coagulating in their aqueous solutions, when latter are heated, and of carrying along with them other colloid substances contained in their solutions. On cooling down, not only the alkyl derivatives of the polysaccharides, but also the other coprecipitated colloid bodies enter into solution or suspension again. This property of the water-soluble alkyl derivatives of cellulose, starch, dextrine and the like admits of a thorough purification of the colloid selenides or tellurides by washing them with hot water.

*Example.*

200 parts by weight of a 3 to 10% solution of a water-soluble ethyl cellulose, or methyl cellulose or ethyl starch, or methyl starch are in the presence or absence of ammonia mixed with 300 to 700 parts of a solution of auric chloride, or of some other soluble gold salt, which in 100 parts by weight of which solution contains about one part by weight of metallic gold. Into this mixture is introduced hydrogen selenide, in an aqueous solution, or in the gaseous or liquid state, preferably in a quantity calculated on the amount of gold contained in the reaction mixture. On introducing the hydrogen selenide a dark olive-brown-coloured hydrosol of the selenide of gold (aurous selenide) is produced. The reaction mixture, with or without a further addition of water, is then warmed on the water bath to 50–80° C. whereby the alkyl derivative of the carbohydrate, together with the selenide of gold, precipitates in the shape of a flocculent precipitate or of a lumpy coagulum (according to the amount of the alkyl derivative of the carbohydrate contained in the mixture). The dark coloured precipitate is separated from the mother-liquor by filtering in a hot-water jacketed filter and is thoroughly washed with hot water. The washed out precipitate is then taken from the filter, and either dried (optionally after a previous treatment with alcohol or with alcohol and ether) or, by cooling down and stirring, directly dissolved even in the amount of water adhering to the precipitate or by the addition of a further quantity of water.

If, as protective colloid, an alkyl derivative of cellulose, starch and the like is employed, which is soluble not only in water but also in organic solvents, for instance in strong or diluted alcohol, the final product before it is dried, may, if required, be dissolved in alcohol and precipitated by ether.

Of course, instead of the coagulation by heat and subsequent washing with hot water, other purifying methods may be employed in the foregoing example, such as dialysis, or precipitation by alcohol and washing with alcohol or precipitation by a mixture of alcohol and ether and the like.

According to the foregoing example i. e., the quantity of hydrogen selenide introduced, different gold selenides such as $Au_2Se_3$, or $Au_2Se_2$, or $Au_2Se$ or a mixture of two or all three bodies may be produced.

The expression "gold selenide," wherever it occurs in this specification and the appended claims, means one of the foregoing compounds or a mixture of two or three of the same.

In place of a salt of gold other metal compounds may be successfully employed. By the present process it is an easy matter to produce colloidal selenides or tellurides of iridium, palladium, osmium, platinum, mercury, silver, copper, tin, etc.

Instead of hydrogen selenide or hydrogen telluride other selenium or tellurium compounds may be employed. Thus selenides can be produced by means of selenium compounds with bases: for instance alkalies, or ammonia, or alkyl arsines, or alkyl-phosphines and the like.

If no protective colloids or if protective colloids other than the protective colloids given in the foregoing example are employed, the coagulation by heat with the subsequent washing and redissolving is not feasible. In such cases this purifying method must be replaced by some other, such as dialysis and the like.

The specific examples herein given are for the purpose of illustrating the preferred procedure, but the invention is not restricted thereto.

The expression "polysaccharides" in the specification as well as in the claims means: carbohydrates of the empirical formula $n(C_6H_{10}O_5)$ such as cellulose, its conversion products, or derivatives, starch, dextrine, carragheen, lichenin, inulin, geloses and the like.

The present application is in part a continuation of my co-pending application No. 437,320, filed January 14, 1921, especially as regards the use of the ethers of the polysaccharides which are soluble in cold water.

The medicinal suspensions are preferably administered by intravenous or subcutaneous or intratumoral injection, being thereby carried to the tumors or other affected parts by the blood circulation. The intravenous injection method seems (of the methods thus far tried out) to give the most favorable results. A quantity of the gold selenide such as $Au_2Se$ (preferably in a colloidal suspension, say a hydrosol containing 1 to 5% by weight of the gold selenide) corresponding for example to about 0.06 to 0.5 grams of gold selenide can, by this method, be administered to a patient weighing 50 to 70 kilograms (110 to 154 pounds) in one injection. This dose can be repeated after one to three days for about three weeks or two months, and is found to give good results in the treatment of tumors and some other diseases. Such course of treatment can be repeated several times at appropriate intervals (say after waiting from three to ten weeks). My experiments have also indicated that some of the selenides and tellurides (preferably in the colloidal condition) are also suitable for the treatment of other maladies, notably tuberculosis and syphilis, the treatment being similar. Other selenides or tellurides may likewise be employed, the gold selenide being here given for example only.

The wide limits indicated in the foregoing statement with regard to the single doses of gold selenide (0.06 to 0.5 grams) are accounted for, by the fact that the amounts to be administered have to be adjusted to:

(a) The amount of vitality possessed by the patient. (Patients in a state of extreme weakness have to be treated with small single doses, whilst patients of a fair amount of vitality may stand single doses of 0.5 grams of gold selenide and even more.)

(b) The character, size and situation of the disease, etc.

I claim:—

1. A medicinal composition useful in the treatment of malignant tumors and other diseases, containing a metal compound of a metalloid element of the sixth group of the periodic system, having an atomic weight between 79.2 and 127.6, substantially as described.

2. A medicinal composition useful in the treatment of malignant tumors and other diseases, containing a metal compound of a metalloid element of the sixth group of the periodic system, having an atomic weight between 79.2 and 127.6, said compound being in a collodial state, substantially as described.

3. A medicinal composition useful in the treatment of malignant tumors and other diseases, containing a metal compound of a metalloid element of the sixth group of the periodic system, having an atomic weight between 79.2 and 127.6, said compound being in a collodial state, together with a protective colloid, substantially as described.

4. A medicinal composition useful in the treatment of malignant tumors and other diseases, containing a metal compound of a metalloid element of the sixth group of the periodic system, having an atomic weight between 79.2 and 127.6, said compound being in a collodial state, together with a water-soluble ether of a polysaccharid, substantially as described.

5. A medicinal composition useful in the treatment of malignant tumors and other diseases, which comprises a hydrosol of a collodial metal compound of a metalloid element of the sixth group of the periodic system, having an atomic weight between 79.2 and 127.6, substantially as described.

6. A process of making a remedy for malignant tumors and other diseases which comprises producing a binary compound of a metal with a metalloid element of the sixth group of the periodic system having an atomic weight between 79.2 and 127.6, in the colloidal state, in the presence of a water-soluble alkyl derivative of a polysaccharide.

7. A process of forming a remedy for malignant tumors and other diseases, which comprises reacting upon a compound of a metal of which the selenide and telluride are insoluble, with a soluble binary compound of a metalloid element of the sixth group of the periodic system which has an atomic weight between 79.2 and 127.6, while in the presence of an ether of a polysaccharide which ether is solube in cold water but not in hot water.

8. A medicinal composition containing aurous selenide $Au_2Se$.

9. A medicinal composition containing aurous selenide $Au_2Se$ in the colloidal state.

10. A medicinal composition containing aurous selenide $Au_2Se$ in the colloidal state and a protective colloid.

11. A medicinal composition containing the aurous selenide $Au_2Se$ in the colloidal state and a water-soluble alkyl derivative of a polysaccharide.

12. A medicinal composition containing gold selenide in the colloidal state.

13. A medicinal composition containing gold selenide in the colloidal state and a water-soluble alkyl derivative of a polysaccharide.

14. A medicine containing as ingredients thereof gold selenide and a water-soluble alkyl derivative of a polysaccharide.

15. A process of producing a medicine, which comprises reacting upon a metal compound with a binary compound containing hydrogen and a metalloid element of the sixth group of the periodic system having an atomic weight between 79.2 and 127.6 in the presence of ammonia and a cold water-soluble ether of cellulose.

16. A process of producing a medicine, which comprises reacting upon a metal compound with a binary compound of hydrogen with a metalloid element of the sixth group of the periodic system having an atomic weight between 79.2 and 127.6 in the presence of ammonia, and in the presence of an alkyl ether of a polysaccharid, said ether being soluble in cold water.

17. A process of producing a medicine, which comprises reacting upon a metal compound with a binary compound of hydrogen with a metalloid element of the sixth group of the periodic system having an atomic weight between 79.2 and 127.6 in the presence of ammonia, and in the presence of an alkyl ether of cellulose, said ether being soluble in cold water, but not in hot water.

In testimony whereof I affix my signature.

DR. LEON LILIENFELD.